United States Patent
Mirell et al.

(10) Patent No.: US 8,670,181 B1
(45) Date of Patent: Mar. 11, 2014

(54) METHOD AND APPARATUS FOR GENERATING DUALITY MODULATED ELECTROMAGNETIC RADIATION

(76) Inventors: Stuart Gary Mirell, Los Angeles, CA (US); Daniel Joseph Mirell, Irvine, CA (US)

(*) Notice: Subject to any disclaimer, the term of this patent is extended or adjusted under 35 U.S.C. 154(b) by 588 days.

(21) Appl. No.: 12/952,075

(22) Filed: Nov. 22, 2010

Related U.S. Application Data

(60) Provisional application No. 61/263,816, filed on Nov. 23, 2009.

(51) Int. Cl.
*G02B 5/18* (2006.01)

(52) U.S. Cl.
USPC ........................................................ 359/566

(58) Field of Classification Search
None
See application file for complete search history.

(56) References Cited

U.S. PATENT DOCUMENTS

| | | | | |
|---|---|---|---|---|
| 4,330,211 A | * | 5/1982 | Peterson et al. | 356/521 |
| 4,502,756 A | * | 3/1985 | Peterson et al. | 359/572 |
| 5,136,424 A | * | 8/1992 | Cox et al. | 359/394 |
| 6,028,686 A | * | 2/2000 | Mirell et al. | 398/201 |
| 6,804,470 B1 | * | 10/2004 | Mirell et al. | 398/182 |
| 7,262,914 B2 | * | 8/2007 | Mirell et al. | 359/566 |
| 8,081,383 B1 | * | 12/2011 | Mirell et al. | 359/577 |
| 2006/0050391 A1 | * | 3/2006 | Backlund et al. | 359/573 |

* cited by examiner

*Primary Examiner* — Arnel C Lavarias
(74) *Attorney, Agent, or Firm* — Noel F. Heal

(57) ABSTRACT

A generator of duality modulated radiation and a corresponding method for its use. The generator depletes or enriches the proportion of energy relative to the wave intensity of a beam. Duality modulation is achieved using a single input beam that is incident on a diffractive grating. For a selected grating structure, the angle of incidence, the wavelength of the input beam and the periodicity of the grating are selected to achieve a desired duality modulation in a diffracted output beam.

9 Claims, 4 Drawing Sheets

METHOD AND APPARATUS FOR GENERATING DUALITY MODULATED ELECTROMAGNETIC RADIATION

BACKGROUND OF THE INVENTION

This invention relates generally to techniques for generating electromagnetic (photon) radiation that is modulated in energy relative to wave intensity. The term duality modulation is applied here to specify this form of modulation. In particular, the invention relates to applications of such duality modulated electromagnetic radiation in which it would be highly desirable to modulate the radiation with information, where that radiation simultaneously is highly depleted in its relative proportion of energy. For example, it is well known in the art that photon beams may be used to scan and characterize a target object that is potentially damaged by excessive absorption of energy. Alternatively, in other particular applications it may be desirable to minimize the target object's capability to conventionally detect an interrogating scan beam. In various communications applications, the objective may be to securely transmit a signal beam without incurring interception and detection by conventional receivers. All of these applications would benefit from the use of beams highly depleted in energy relative to wave intensity. Other applications make use of radiation having an energy component that is enriched relative to wave intensity.

In their U.S. Pat. No. 7,262,914 entitled "Method and Apparatus for Generating and Detecting Duality Modulated Electromagnetic Radiation," the present inventors disclosed and claimed various embodiments of an invention that meets the goals outlined above. The disclosure of U.S. Pat. No. 7,262,914 is hereby incorporated by reference into this specification. Two of the inventors' earlier patents are also hereby incorporated by reference into this specification. These are U.S. Pat. No. 6,028,686. "Energy-Depleted Radiation Apparatus and Method," and U.S. Pat. No. 6,804,470, also entitled "Energy-Depleted Radiation Apparatus and Method."

In brief, all of the various forms of apparatus and corresponding methods that were claimed in U.S. Pat. No. 7,262,914 involved the convergence of a plurality of mutually coherent beams to form a periodic interference pattern. When a diffraction grating with a periodicity related to that of the interference pattern is positioned appropriately in the converging beams, the grating outputs a plurality of divergent duality-modulated beams. Although this arrangement operates satisfactorily in the manner described in the patent, a practical limitation is the inherent difficulty in aligning multiple beams appropriately to impinge on the grating. The present invention obviates this difficulty by avoiding the requirement for multiple beams, as further explained in the following summary.

SUMMARY OF THE INVENTION

The present invention resides in a generator of duality modulated radiation that employs a single beam of coherent radiation and a single diffraction grating on which the beam impinges. Radiation emerging from the diffraction grating forms a plurality of diffracted beams, at least one of which is duality modulated.

Briefly, and in general terms, the apparatus of the present invention takes the form of a generator of duality modulated radiation, comprising a radiation source providing a single mono-energetic coherent input beam having a selected wavelength, and a selected diffractive grating structure having a selected periodicity and being positioned to receive the input beam at a selected angle of incidence. The generator has three critical interdependent parameters for a selected grating structure: beam wavelength, diffractive grating periodicity and angle of incidence. These parameters are appropriately selected to produce at least one duality modulated output beam from the diffractive grating. The invention may also be expressed as a method of generating duality modulated radiation, comprising the steps of generating a single mono-energetic coherent input beam of selected wavelength; placing in the path of the input beam a diffraction grating having a selected periodicity and structure, such that the input beam impinges on the diffraction grating at an angle of incidence and generates diffracted output beams of predictable diffraction orders; and selecting the angle of incidence that results in an output beam having a desired condition of duality modulation.

Other aspects of the invention will become apparent from the more detailed description that follows, taken in conjunction with the drawings described in the paragraphs below.

DESCRIPTION OF THE INVENTION

Figure 1A:
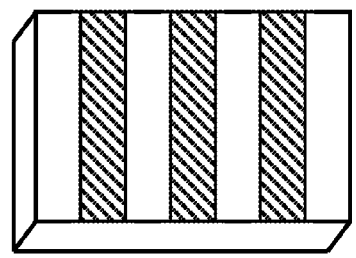
FIG. 1A is a perspective view of a small segment of a transmissive grating applicable to the invention showing periodic structures that include opaque regions and transmissive regions.

As shown in the drawings for purposes of illustration, the present invention pertains to significant improvements in techniques for generating duality modulated radiation, that is to say electromagnetic radiation of which the irradiance I is depleted or enriched with respect to the wave intensity W. It will be understood by those skilled in the art that references to a light beam in this description are not intended to limit the invention to apply to the modulation of light in the visible portion of the electromagnetic spectrum. Radiation at other frequencies, such as at various radio frequencies (RF) may be modulated and demodulated in accordance with the principles of the invention described, since it is well understood that optical components such as gratings and couplers have counterparts that perform analogous functions in the RF portion of the spectrum.

Gratings of the "transmission" type are emphasized here in the method and apparatus for generating duality modulated electromagnetic radiation. Nevertheless, it will be appreciated, that gratings of the "reflection" type are equally applicable and are within the scope of the present invention.

The present invention is applicable over a wide range of the electromagnetic spectrum. FIGS. 1-5 relate to examples in the optical regime but minor variants would be applicable in other regimes such as that of microwaves.

Figure 1B:
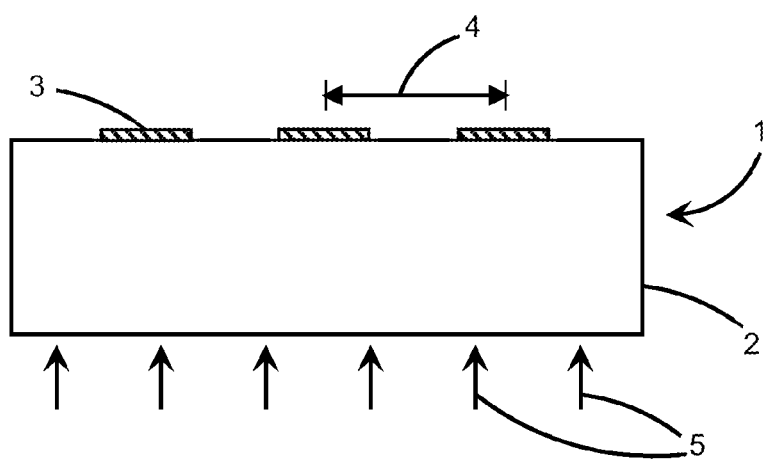
FIG. 1B is a typical detailed cross-sectional view of the segment of the FIG. 1A grating including depiction of a small fraction of the rays from a single incident beam.

On FIGS. 1A and 1B, showing small segments of suitable transmissive gratings, the opaque regions 3 are bands typically consisting of metallic depositions such as chromium. These two figures show equal width opaque and transmissive bands associated with Ronchi rulings. However, other width proportions are also applicable. A small fraction of incident rays 5 of a beam normally incident on a transmissive substrate 2 are depicted. Since gratings suitable for the invention require periods 4 smaller than typical beam diameters by several orders of magnitude, the full beam diameter cannot be proportionately represented in a detailed view of the grating periods.

Figure 1C:
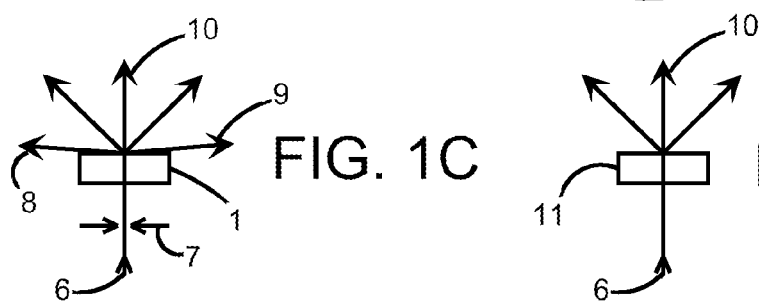
FIGS. 1C and 1D both depict normally incident identical beams and their resultant diffractive orders on two nearly identical transmissive gratings that differ very slightly in period.
Figure 1D:
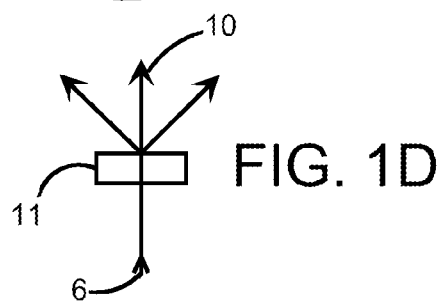

FIG. 1C depicts the full grating 1 with normal incidence of a beam 6 and diffractive orders 8 and 9 that are output nearly parallel to the grating plane, i.e. at the plane's threshold. In this full grating depiction, the full beam diameter 7 is shown. FIG. 1D shows an identical configuration except that the grating, indicated here at 11, has a marginally smaller period than that of grating 1, resulting in the absence of orders 8 and 9 as they change from propagating orders to evanescent orders. The measured irradiances on an order such as 10 exhibit a differential value when comparing the two configurations.

Figure 1E:
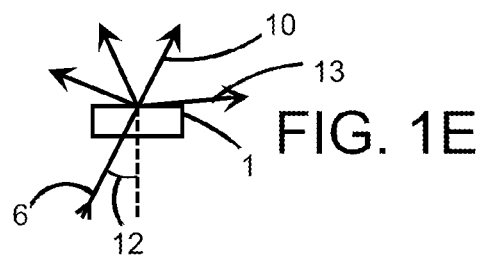
FIGS. 1E and 1F both depict identical transmissive gratings and their resultant diffractive orders for two very slightly different angles of the incident beams.
Figure 1F:
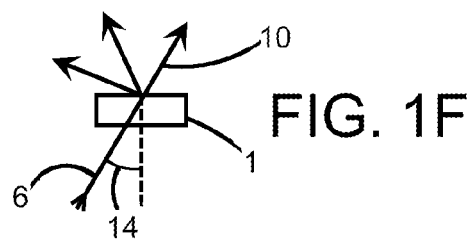

Similarly, FIGS. 1E and 1F depict nearly identical configurations. As the incidence angle 12 shown in FIG. 1E is increased to its marginally greater value, shown at 14 in FIG. 1F, order 13 makes the transition to evanescence and irradiance inflections are observed on a propagating beam such as the order shown at 10.

Figure 2A:
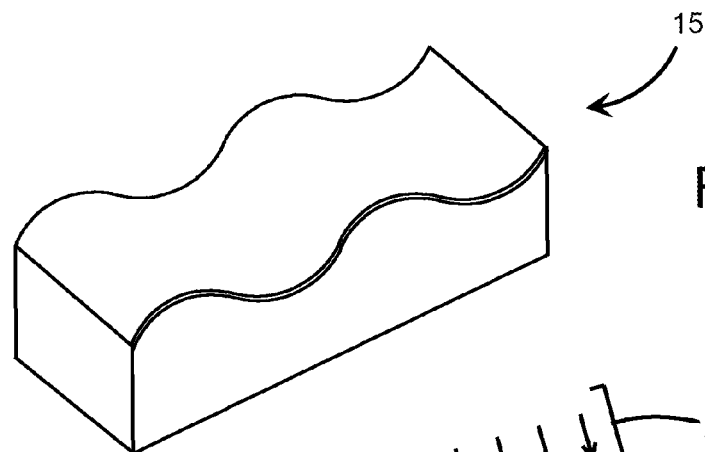
FIG. 2A is a perspective view of a small segment of a reflective grating applicable to the invention showing the geometrical contour of the periodic structures.
Figure 2B:
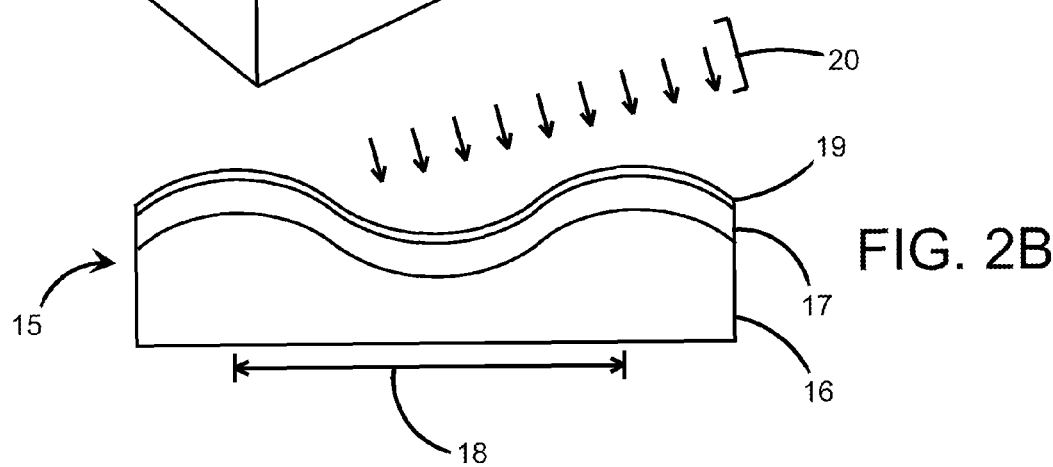
FIG. 2B is a typical detailed cross-sectional view of the segment of the FIG. 2A grating including depiction of a small fraction of the rays from a single incident beam.
Figure 2C:
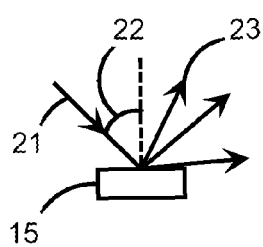
FIGS. 2C and 2D both depict identical reflective gratings and their resultant diffractive orders for two very slightly different angles of the incident beams.
Figure 2D:
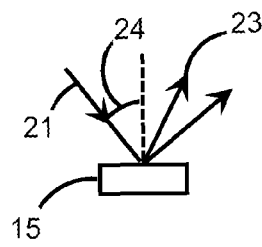

Reflective grating analogs 15 to the FIG. 1 transmissive gratings are shown in FIGS. 2A and 2B. Typically, a metallic coating 17 is deposited on a substrate 16 and protected with a dielectric coating 19. The depicted structure is, in cross section, approximately sinusoidal with a period indicated at 18. A fraction of the incident beam rays are depicted as 20. FIGS. 2C and 2D show an incident beam 21 in nearly identical configurations of the reflective grating of FIGS. 2A and 2B. As the incidence angle is decreased from the angle shown at 22 in FIG. 2C to the angle shown at 24 in FIG. 2D, a diffractive order at threshold makes the transition from propagating to evanescent. Irradiance measurement of an order such as 23 during this transition demonstrates that concurrent inflections are observed in the propagating beam.

These irradiance inflections for selected diffractive gratings, at critical parameters of wavelength, periodicity and incidence angle, are known in the art as grating diffraction anomalies. The present invention teaches the assessment and extraction of duality modulated radiation associated with the presence of these inflections.

Figure 3:
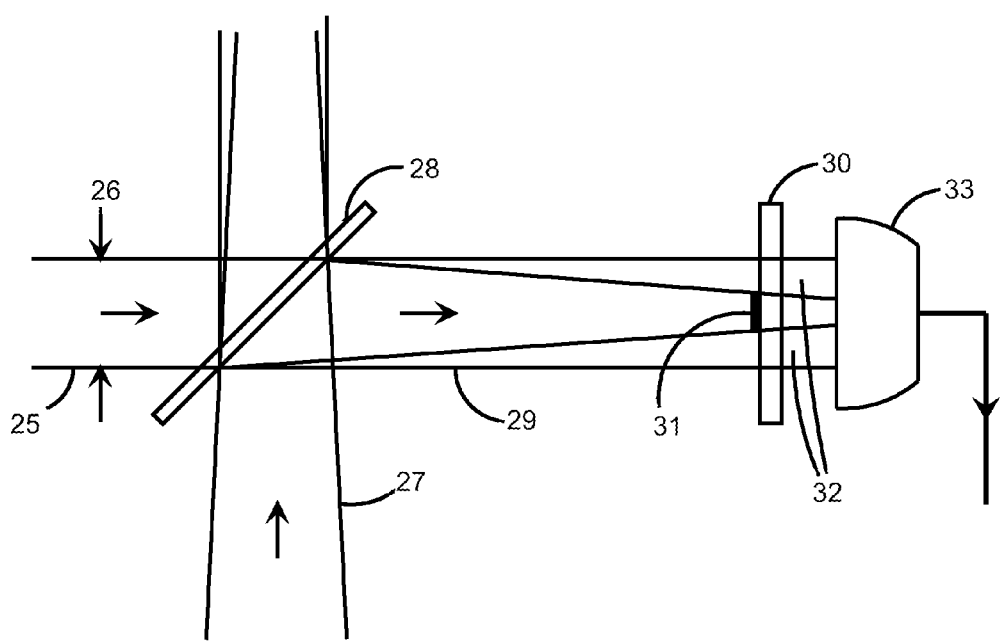
FIG. 3 shows an example of an apparatus for coupling a duality modulated signal beam to a restoration beam and demodulating the signal beam.

FIG. 3 illustrates an apparatus for demodulating a beam such as 10 or 23 (FIGS. 1C-1D or FIGS. 2C-2D, respectively, which is here indicated by reference numeral 25, a "signal" beam that as a function of time may be encoded with a time-varying duality modulation. That beam 25 is coupled to a much more intense, constant beam 27, referred to in this description as a reference beam and generated by an independent laser of the same wavelength and polarization, through a beam splitter 28. The width 26 of signal beam 25 and that of reference beam 27 are essentially equal at the point where they both impinge on the beam splitter 28 but a convergence of the reference beam 27 along the coupling trajectory, indicated at 29, substantially reduces the reference beam diameter at a transmissive plate 30 to that of a centrally located blocking mask 31. Emerging from the transmissive plate 30 is an annular beam 32 almost exclusively consisting of radiation wave intensity from the signal beam 25 to be demodulated. The irradiance of this beam 25 is measured by a detector 33.

This FIG. 3 configuration facilitates equilibration of any depletion or enrichment of beam 25 by coupling transfer of irradiance from reference beam 27 acting as a source or sink, respectively, along the coupling trajectory 29. Thereby, the irradiance of the beam 25 to be demodulated is respectively increased or decreased when reference beam 27 is present relative to the irradiance of beam 25 when reference beam 27 is blocked. The differential between these two settings provides the necessary information to measure the magnitude and type, i.e., depletion or enrichment, of the signal's duality modulation.

Figure 4:
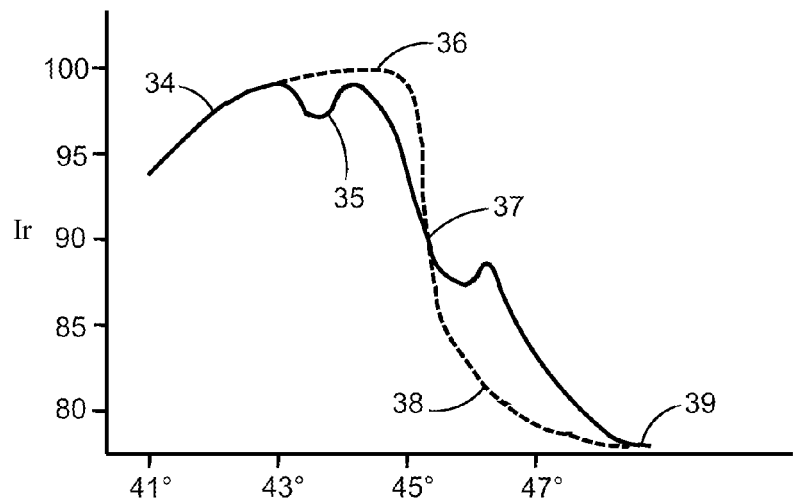
FIG. 4 is a graph of irradiance on duality modulated and demodulated beams as a function of angle for a transition such as that depicted in FIG. 1E to FIG. 1F.

FIG. 4 shows an example of a transition of the type shown in FIGS. 1E and 1F. The irradiance on beam 10 is plotted as a function of incidence angle. Beam 10 is equivalently indicated in FIG. 3 by reference numeral 25. The solid line 34 in the graph of FIG. 4 represents the irradiance on beam 25 when reference beam 27 is blocked and demonstrates inflections in the irradiance, one of which is indicated at 35. When reference beam 27 is not blocked and is allowed to couple to reference beam 25, the measured irradiance departs from the solid line in two angular regions identified by dashed lines, specifically at 36 where the irradiance increases above the solid line 34 value until the graphs cross as indicated at 37, and at 38 where the irradiance decreases below the solid line 34 until the two graphs merge again, as indicated at 39. These deviations demonstrate that the first region represents depleted output on beam 10/25 and the second region represents enriched output on beam 10/25.

Figure 5:
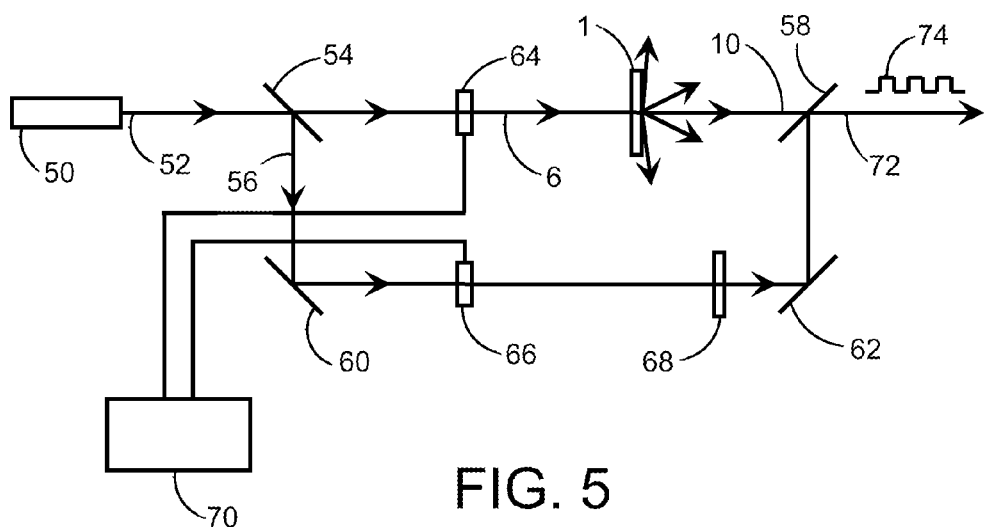
FIG. 5 depicts an application of the invention in which a duality modulated signal is encoded on an output beam.

The duality modulation (DM) generating method and apparatus described here can be configured in novel combinations of methods and apparatus to provide for novel applications of DM radiation. For example, various configurations can be described that switch an output beam between DM radiation and ordinary, i.e., non-DM, radiation. FIG. 5 shows one such apparatus with an output consisting of an unremarkable constant-power train of optical pulses, i.e., the irradiance of each digital pulse is constant. A conventional energy-sensitive receiver intercepting a signal encoded by this means would detect a uniform train of pulses devoid of information. Nevertheless, the pulse train is encoded as some sequence of DM and ordinary pulses.

As shown in FIG. 5, an input beam 52 from a laser 50 is divided by an initial beam splitter 54. The upper beam 6 undergoes some fixed DM after passing through a grating 1 and an output diffractive order 10 exits through a second beam splitter 58. The lower beam 56 is directed by mirrors 60 and 62 to the second beam splitter 58. Beam 56 passes through an attenuator 68 that reduces that beam's irradiance to the same value as that of beam 10 emerging from grating 1. Optical switches 64 and 66 are interposed respectively on the two beams 6 and 56. An electronic optical switch controller 70 sends signals to both optical switches, repeatedly blocking transmission of both switches for some time interval $\Delta t_1$ and unblocking transmission on only one selected switch for some time interval $\Delta t_2$.

The resultant output on beam 72 consists of a series of constant-irradiance pulses 74 as measured by a conventional detector. However, each of the pulses is encoded as either DM or ordinary non-DM by the selected switch setting during that pulse's associated $\Delta t_2$. If for example the DM of the grating 1 is a 2% depletion, a suitable coupling of the output beam with a restoration beam as in FIG. 3 will yield a demodulated pulse train with selected pulses having a 2%-increased irradiance relative to the other pulses. In this example of a 2% depletion, those DM-encoded pulses have the same irradiance as the ordinary pulses but have a 2% higher wave intensity. After coupling, that higher wave intensity on the DM-encoded pulses translates to a relative 2%-increase in irradiance.

The present method and apparatus for generating duality modulated radiation is associated with gratings that have periods that are on the same order of magnitude as the wavelength. The outputs of such combinations are well known to produce only a very few propagating diffractive orders and these orders are angularly widely distributed across the plane of incidence.

In contrast, the apparatus described U.S. Pat. No. 7,262,914 required gratings much coarser than those suitable in the present invention. The periods of those coarse gratings necessarily exceeded the incident wavelength by several orders of magnitude because of the technical impracticality of multiple interfering converging incident beams maintaining an exact phase relationship with grating periods as small as a wavelength.

Since the diffractive orders from coarse gratings are angularly very close, the intense lower numbered orders all are within a small angular range and, upon single beam incidence, would not measurably exhibit the irradiance anomalies associated with the gratings applicable to the present invention.

It will be appreciated from the foregoing detailed description that the present invention represents a significant advance in apparatus for generating radiation that is duality modulated. In particular, the invention provides a simple way of duality modulating a single beam of coherent radiation, without the need for precisely aligning multiple incident beams. Thus the apparatus of the present invention is both more robust and more compact than its predecessors. It will also be appreciated that, although a number of specific embodiments of the invention have been described in detail for purposes of illustration, various modifications may be made without departing from the spirit and scope of the invention. Accordingly, the invention should not be limited except as by the appended claims.

The invention claimed is:

1. A generator of duality modulated radiation, comprising:
 a radiation source providing a single mono-energetic coherent input beam having a selected wavelength; and
 a diffractive grating having a selected periodicity and structure and that grating being positioned to receive the input beam at a selected angle of incidence;
 wherein the generator has critical parameters of beam wavelength, diffractive grating periodicity and angle of incidence that are selected to produce at least one duality modulated output beam from the diffractive grating.

2. A generator of duality modulated radiation as defined in claim 1, wherein:
 the periodicity of the grating is very approximately the same as the wavelength of the input beam.

3. A generator of duality modulated radiation as defined in claim 1, wherein:
 at least one of the generator critical parameters is adjustable to tune the generator to produce a duality modulated output beam of a selected type.

4. A generator of duality modulated radiation as defined in claim 3, wherein:
 the angle of incidence of the input beam is adjustable to switch the output beam modulation state between duality modulated and not duality modulated.

5. A generator of duality modulated radiation as defined in claim 4, and further comprising means for supplying a time-dependent information signal for duality modulation of the radiation.

6. A method of generating duality modulated radiation comprising the steps of:
 generating a single mono-energetic coherent input beam of selected wavelength;
 directing the input beam along a selected path;
 placing in the path of the input beam a diffraction grating having a selected periodicity and structure, such that the input beam impinges on the diffraction grating at an angle of incidence and generates diffracted output beams of predictable diffraction orders; and
 selecting the angle of incidence that results in an output beam having a desired condition of duality modulation.

7. A method as defined in claim 6, wherein the input beam has an irradiance I and a wave intensity W, and wherein the desired condition of duality modulation is one in which the irradiance I of the beam is either enriched or depleted with respect to the wave intensity W.

8. A method of generating a constant irradiance signal having a duality modulated component, the method comprising the steps of:
 generating a single mono-energetic coherent input beam of selected wavelength;
 deriving from the input beam first and second beams directed along respective paths;
 placing in the path of the first beam diffraction grating having a selected structure and periodicity, such that the first beam impinges on the diffraction grating at an angle of incidence and generates diffracted output beams of predictable diffraction orders;
 selecting an angle of incidence of the first beam that results in an output beam having a desired condition of duality modulation; and
 combining the output beam with the second beam derived from the input beam, to generate a composite output beam that has an irradiance the same as that of the output beam and includes duality modulated components.

9. A method as defined in claim 8, wherein the combining step includes time-division multiplexing the second beam and the output beam such that sequential time divisions of the composite beam are selectively derived from either the second beam or the duality modulated output beam.

* * * * *